United States Patent Office

3,781,382
Patented Dec. 25, 1973

3,781,382
THERMOPLASTIC RESIN MIXTURE AND PROCESS FOR PRODUCING THE SAME
Shinichi Izawa, Tokyo, and Kunio Toyama, Kazuhiko Harada, and Yoshiaki Sugawara, Kanagawa, Japan, assignors to Asahi-Dow Limited, Tokyo, Japan
No Drawing. Filed Sept. 1, 1971, Ser. No. 177,171
Claims priority, application Japan, Sept. 8, 1970, 45/78,220
Int. Cl. C08f 27/00; C08g 43/02
U.S. Cl. 260—874    6 Claims

ABSTRACT OF THE DISCLOSURE

Polyphenylene ether compositions which are useful for parts of electric devices, and having particle sizes of 5 micron or larger, together with aromatic monovinyl compound polymers. They are prepared by the oxidative polymerization of 2,6-dimethylphenol or the like by air, in the presence of a catalyst therefor, aromatic monovinyl compound and a medium which dissolves the above-mentioned compounds but does not dissolve polyphenylene ether having a specific viscosity of 0.25 or more, wherein the concentration of the above-mentioned phenol is 15 to 35% by weight, and the polymerization product is dispersed in water and then the dispersion is polymerized to polymerize the aromatic vinyl compound.

BACKGROUND OF THE INVENTION

Field of the invention

The present invention relates to a resin mixture containing aromatic polyphenylene ether and aromatic vinyl polymers and a process for producing the same.

Description of prior art

Polyphenylene ether is a favorable resin having excellent thermal, mechanical and electrical properties. It also is excellent in chemical properties such as alkali resistance, acid resistance, hot water resistance and the like. It can be utilized for the parts of electric and electronic devices, the parts of television communication devices and the housing of home electric devices. It can also be utilized for the apparatus of hot water supply, the parts of automobile, etc.

It is known that a resin mixture of polyphenylene ether and aromatic vinyl compound exhibits superior properties to those of the respective one component resins (for example, see U.S. Pat. No. 3,383,435). To such effect, polyphenylene ether and aromatic vinyl polymer are blended with each other. Alternatively, U.S. Pat. Nos. 3,356,761, 3,384,682 and 3,487,127 disclose that an aromatic vinyl monomer, e.g. styrene, is polymerized in the presence of a polyphenylene ether. In the case of using a 2,6-disubstituted phenol as the starting material for polyphenylene ether, the catalyst present in the polymerization or the phenol itself exerts ill effect on the polymerization of the aromatic vinyl compound. Accordingly, the polyphenylene ether must be once isolated and purified, and then added to the aromatic vinyl compound.

U.S. Pat. No. 3,384,619 discloses that alcohols are effective as a cocatalyst for the polymerization catalyst. It describes that, in the case of using an alcohol as the medium for the polymerization system as well as the cocatalyst, the polymer precipitates as the polymer is formed. However, in the case of using toluene as the medium and using an alcohol such as ethanol, n-propanol, n-butanol, t-butanol, cyclohexanol or benzyl alcohol as the cocatalyst, in an amount of 25% based on the toluene, it is silent whether or not a polymer precipitates. Even if the precipitation should be formed, it is necessary to pour the polymerization mixture into 4 times as much methanol to precipitate the polymer. In these conventional processes, the proportions of 2,6-disubstituted phenol monomers in the total polymerization systems are small, and the amount of solvents used are large. Thus, the polymers formed are composed of extremely fine particles, i.e. less than 5 micron in particle size. Great difficulties are encountered in centrifugal separation, filtration, drying and the like, before the product polymers are used. The polymers are not stable.

When 2,6-disubstituted phenol monomer is used in large amount in the conventional processes, the viscosity of the polymerization mixture increases whereby the handling in industrial scale becomes difficult.

The present inventors have discovered that a stable slurry containing large polymer mixture particles of granular polyphenylene ether and aromatic vinyl polymers by the oxidative polymerization of a solution comprising a 2,6-disubstituted phenol monomer and an aromatic vinyl monomer to polymerize 2,6-disubstituted phenol, transferring the whole of the polymerization prdouct into an aqueous medium in order to suspend the polymer and the aromatic vinyl monomer, and then polymerizing the aromatic vinyl monomer.

SUMMARY OF THE INVENTION

It is an object of the present invention to provide a mixture resin of polyphenylene ether and aromatic vinyl polymer, having from 5 to 500 microns in particle size.

It is another object of the present invention to provide a new process for producing the above mentioned mixture resin.

It is a further object of the present invention to provide a commercial process with respect to shortening of steps and reduction of solvents.

The present resin comprises from 1 to 9 parts of polyphenylene ether and from 9 to 1 part of aromatic vinyl polymers, based on 10 parts of the total. Preferable amount of polyphenylene ether is 2 parts or more, most preferably 3–8 parts.

In order to prepare the mixture resin, oxidative polymerization of 2,6-disubstituted phenol is first effected in the presence of an aromatic vinyl compound, and subsequently, the thus obtained product is dispersed in water to polymerize the aromatic vinyl compound. In the oxidative polymerization, 2,6-disubstituted phenol is subjected to polymerization in a solution thereof containing a polymerization catalyst therefor and aromatic vinyl compound monomer. The solvent medium should dissolve the materials mentioned above but not dissolve the polymer of the 2,6-disubstituted phenol, i.e. polyphenylene ether. The amount of 2,6-disubstituted phenol as in the solution should be from 15 to 35% by weight. On dispersing the oxidative polymerization product in water, the aromatic vinyl monomer is transferred into particles of polyphenylene ether in the form of swelling particles, whereas the polymerization catalyst for the oxidative polymerization, oligophenylene ether and 2,6-substituted phenol unaltered, if any, are dissolved in an aqueous phase. The aqueous dispersion is subjected to polymerization to effect polymerization of vinyl monomer.

DESCRIPTION OF THE PREFERRED EMBODIMENTS (I) Preparation of Polyphenylene Ether or Oxidative Polymerization of 2,6-Substituted Phenol (A) Materials (a) 2,6-disubstituted phenol.—There may be used phenols represented by the formula:

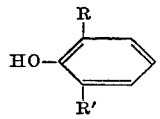

wherein R represents a linear alkyl group having 1 to 4 carbon atoms; and R' represents a halogen atom, an alkoxy group having 1 to 4 carbon atoms or an alkyl group having 1 to 4 carbon atoms. The examples thereof include 2,6-dimethylphenol,
2-methyl-6-ethylphenol,
2,6-diethylphenol,
2-ethyl-6-n-propylphenol,
2-chlor-6-methylphenol,
2-methyl-6-bromophenol,
2-methyl-6-isopropylphenol,
2-methyl-6-methoxyphenol,
2-methyl-6-n-propylphenol,
2-methyl-6-n-butylphenol,
2,6-di-n-propylphenol,
2-chlor-6-ethylphenol and the like.

(b) Aromatic vinyl compound.—It includes styrene, methyl styrene, ethylvinylbenzene, isopropenylbenzene, isopropylstyrene, ethylvinyltoluene, dimethylstyrene, chlorostyrene, dichlorostyrene, trimethylstyrene, and tert-butylstyrene. The compound may be alone or a mixture thereof.

The other vinyl compounds may be contained so far as they are copolymerizable with the above mentioned vinyl compounds. The other vinyl compounds referred to above are methyl methacrylate, butyl acrylate, acrylonitrile, methacrylonitrile, vinyl acetate and the like. They are used in an amount of 10 mol percent or less.

(c) Catalysts.—The catalysts usable for the oxidative polymerization are not critical as long as they accelerate an oxidative reaction of phenol. Preferable catalyst has enough activity even at an amount of 0.1 mol or less, more preferably 0.02 mole or less per 1 mol of 2,6-substituted phenol. Such catalyst has little influence on the subsequent polymerization of aromatic vinyl compound.

One of examples is combinations of a cuprous salt and a tertiary amine such as cuprous chloride-triethylamine, cuprous bromide-triethylamine, cuprous sulfate-tributylamine, cuprous chloride-N-methylmorpholine, cuprous chloride-pyridine, cuprous azide-pyridine, cuprous propionate-benzyldimethylamine, cuprous acetate-N-ethyl piperidine, cuprous tetraamine sulfate-quinuclidine and the like. Another example is a catalyst comprising a cupric salt, a tertiary amine and an alkali metal hydroxide such as cupric chloride-pyridine-potassium hydroxide, cupric acetate-triethylamine - sodium hydroxide, cupric sulfate-N,N,N',N' - tetramethylethylenediamine - potassium hydroxide and the like. Further example is combination of a manganese salt and an amino compound such as manganese (II) chloride-triethylamine, manganese (II) acetate-ethanolamine, manganese (II) acetylacetonate-pyridine, potassium permanganate-pyridine, manganese (II) benzoate-diethanolamine and the like.

Further there may be used a cobalt chelate system catalyst prepared by adding one or more of cocatalysts to a main catalyst. The main catalyst is selected from a group of cobalt compounds wherein water, oxygen, alcohol, amine or the like is coordinated with a cobalt chelate compound represented by the formula:

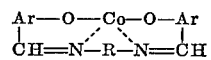

such as

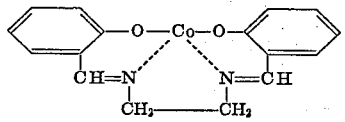

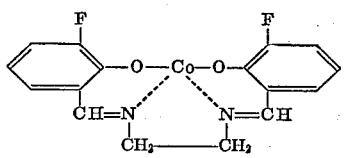

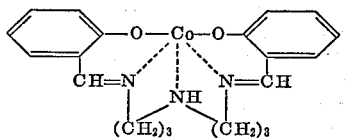

and

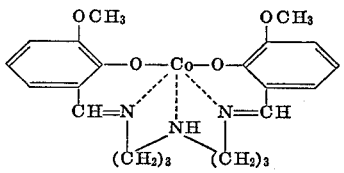

The cocatalyst is selected from the group of transition metal compounds such as cobaltous chloride, cobaltic chloride, nickel chloride, ferrous chloride, ferric chloride, cobaltous acetate, ferrous acetate, ferric acetate, cobaltous propionate, nickel benzoate, $Mn(CH_2COCH_2COCH_3)_2$,
$Mn(CH_2COCH_2COCH_3)_3$,
$Fe(CH_2COCH_2COCH_3)_2$,
$Fe(CH_2COCH_2COCH_3)_3$,
$Co(CH_2COCH_2COCH_3)_2$,
$Co(CH_2COCH_2COCH_3)_3$,
$Ni(CH_2COCH_2COCH_3)_2$,
$Cu(CH_2COCH_2COCH_3)_2$,
$Zn(CH_2COCH_2COCH_3)_2$ and the like.

(d) Media.—The media used in the present invention are those which uniformly dissolve 2,6-substituted phenols as well as materials which have undesirable influence on the subsequent step of polymerization of vinyl compound, said materials being present from the beginning of the oxidative reaction and produced during the oxidative reaction. However, they do not dissolve the polyphenylene ether portions having a $\eta_{sp/c}$ (measured in a 0.5% chloroform solution, at 25° C.) of 0.25 or more among the product polymers.

Preferable examples are methanol, ethanol, n-propanol, iso-propanol, n-butanol, iso-butanol, n-hexanol, n-heptanol, n-octanol, benzyl alcohol, cyclopentanol, cyclohexanol, water, acetonitrile, propionitrile, acrylonitrile, diethyl ether, tetrahydrofuran, pentane, n-hexane, 2-methylpentane, n-octane, cyclopentane, cyclohexane, dimethylformamide, dimethylacetamide, trimethyleneglycol, hexamethyleneglycol, dimethylsulfoxide, hexamethylphosphotriamide, methyl ethyl ketone, diethyl ketone, acetylacetone, benzyl methyl ketone and diethyl carbonate.

(e) Molecular oxygen-containing gases.—Oxygen gas may be used with or without dilution with nitrogen or any other inert gas. Air is one of examples of the present gas.

(B) Process

The monomeric 2,6-substituted phenol, monomeric aromatic vinyl compound and a polymerization catalyst for 2,6-substituted phenol are dissolved in the medium mentioned in (d) above controlling the concentration of the phenol to 15–35%, and then polymerization is effected as usual. Either single medium or a mixed medium mentioned above may be used.

Amounts of 2,6-substituted phenol and aromatic vinyl compound are not critical, but preferably the ratio is from 2:8 to 9:1, more preferably from 3:7 to 8:2 (by weight), respectively.

When the phenol is in an amount as small as less than 5 microns and, furthermore, difficulty is encountered in the subsequent step of polymerization of vinyl compound. When the pehnol is in an amount as high as more than 35% adhesion of polymer particles to the stirring bar, the reactor wall and the like is inevitably seen in the reactor in which a slurry is formed. Thus the employment of such a great amount of 2,6-substituted phenol monomer is not practically suitable.

The polymerization temperature is from 0 to 100° C., preferably, from 10 to 50° C.

Polymerization should proceed until no 2,6-substituted phenol is present as a monomer.

As the oxidative polymerization proceeds, only polyphenylene ether precipitates. The thus precipitating polyphenylene ether particles do not almost contain those which exert unfavorable influences on the subsequent polymerization of aromatic vinyl compound, such as the oxidative polymerization catalyst, 2,6-dissubstituted phenol, oligophenylene ether and the like.

(II) Polymerization of Aromatic Vinyl Compound in the Presence of Polyphenylene Ether (A) Materials (a) Suspension stabilizer.—It includes polyvinyl alcohol, hydroxyethyl cellulose, carboxymethyl cellulose, polyethyleneglycol, polystyreneglycol, polypropyleneglycol, sulfonated polystyrene and the like.

(b) Polymerization initiators.—They are oil-soluble radical initiators. They include benzoyl peroxide, caproyl peroxide, lauroyl peroxide, t-butyl perbenzoate, di-t-butyl peroxide, t-butyl hydroperoxide, cyclohexanone peroxide, dicumyl peroxide, cumene hydroperoxide, diisopropyl peroxide, methyl ethyl ketone peroxide, azobisisobutylonitrile, azobisvaleronitrile, and the like.

(B) Process

Polymerization product obtained in the preceding step is dispersed in a water system containing a suspension stabilizer. The aromatic vinyl compound transfers into the polyphenylene ether particles and is suspended as the swelling particles. Almost all of the other materials contained in the polymerization product are dissolved in the aqueous phase. An oil-soluble radical polymerization initiator is added to the thus obtained suspension mixture to carry out the polymerization of aromatic vinyl compound. On the completion of the polymerization, stable mixed polymer particles can be isolated by filtration.

The water system stands for the solvent system mainly composed of water, and thus it may contain a small amount of additives appropriate for the object of the present invention.

The temperature of the suspension polymerization of aromatic vinyl compounds depends on the polymerization initiator used, and it may be from 50 to 180° C., preferably from 70 to 150° C.

The suspension polymerization of aromatic vinyl compound may be carried out according to any one of the widely known methods. The suspension stabilizer, water ratio, polymerization initiator or the like may be determined depending on the properties of the desired resin mixture. Thus the present invention will not be limited by these conditions, methods and the like of suspension polymerization.

(III) Product

The resin mixture of polyphenylene ether and aromatic vinyl compound polymer is obtained in the form of slurry in which solids have particle size of 5–500 or more microns. The slurry is stable during both polymerizations. When a mixture resin with polystyrene, for example, is obtained, the molecular weight of the polystyrene is that corresponding to $\eta_{sp/c}$ of 0.05–2.0 at 30° C. in a 0.5% concentration.

EXAMPLE 1

2,6-dimethylphenol (1.5 kg.), 0.5 kg. of pyridine and 25 g. of cuprous chloride were dissolved in a medium comprising 0.5 kg. of methanol, 1.5 kg. of styrene and 1.5 kg. of acetone at room temperature. Under stirring, oxygen was passed therethrough at a rate of 6 l./min. to carry out the oxidative polymerization. The reaction mixture was cooled under stirring so that the reaction temperature did not exceed 35° C. After about 30 min., a granular polymer began precipitating. When the reaction was conducted for 3 hours, monomeric 2,6-dimethylphenol did not remain in the reaction mixture at all. This polymerization mixture was added in one portion to a vigorously stirred aqueous mixture system maintained at 70° C. comprising 5.0 kg. water, 1.5 g. polyvinyl alcohol, 1.5 g. sodium dodecylbenzenesulfonate and 0.4 g. boric acid. The particles formed in the polymerization step swelled due to the styrene, but were suspended stably. To this suspension were added 3.0 g. t-butyl perbenzoate and 5.0 g. azobisisobutylonitrile. In 5 hours the temperature of the thus obtained mixture was elevated to 95° C., and further at 110° C. the polymerization was carried out for 9 hours. The granular solid formed was filtered, washed with water and dried to obtain 2.9 kg. resin mixture. The composition of this resin mixture determined by the quantitative analysis by means of infrared spectroscopy was as follows: the poly(2,6-dimethylphenylene-1,4-ether) content, 50%; and the polystyrene content, 50%. The physical properties of the resin mixture of the present example are as follows:

Tensile strength: 810 kg./cm$^2$,
Izod impact strength: 10.3 kg.·cm./cm., and
Thermal deformation temperature: 160° C.

The polymer particles obtained in the present example having particle sizes distributed within 25 to 40 micron were very stable. Their adhesion to a stirring bar or to the reactor wall was not observed at all during the polymerization.

EXAMPLE 2

2,6-dimethylphenol (2.0 kg.), 10 g. Co(CH$_2$COCH$_2$COCH$_3$)$_2$ and 20 g. of a cobalt chelate represented by the formula:

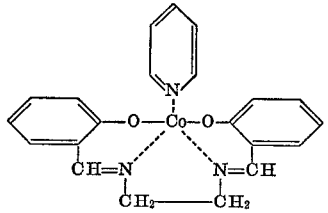

were dissolved in a medium comprising 0.4 kg. of methanol, 1.0 kg. of styrene and 2.6 kg. of n-butanol at room temperature. Under stirring, oxygen was passed therethrough at a rate of 7 l./min. to carry out the oxidative polymerization. In this case, by cooling the temperature of the reaction mixture was maintained at 37° C. or below. After about 25 minutes, a granular polymer began precipitating. When the reaction was conducted for 4 hours, 2,6-dimethylphenol did not remain at all in the reaction mixture. This polymerization mixture was added in one portion to a vigorously stirred aqueous mixture system maintained at 70° C. comprising 8.0 kg. water, 1.2 g. hydroxyethyl cellulose, 1.0 g. sodium dodecylbenzenesulfonate and 0.2 g. sodium salt of N,N-di-2-hydroxyethylglycine. The particles formed in the polymerization step swelled due to the styrene, but were suspended stably. To this suspension were added 5.0 g. t-butyl perbenzoate and 1.5 g. azobisisobutylonitrile. In 3 hours the temperature of the thus obtained mixture was elevated to 100° C., and further at 115° C. the polymerization was carried out for 3 hours. The granular solid formed was filtered, washed with water and dried to obtain 2.9 kg. resin mixture. It was made clear from the analysis by means of infrared spectroscopy that the poly(2,6-dimethylphenylene-1,4-ether) content in the resin mixture was 65%. The physical properties of this resin mixture was as follows:

Tensile strength: 960 kg./cm.², 
Izod impact strength: 13.8 kg.·cm./cm., and
Thermal deformation temperature: 175° C.

Particles of the resin mixture were stable and were within the range of 60 to 100 microns.

EXAMPLE 3

2,6-dimethylphenol (1.5 kg.), 0.4 kg. of tri-n-butylamine and 40 g. of cuprous chloride were dissolved in a medium comprising 0.5 kg. of styrene and 2.0 kg. of dimethyl formamide at room temperature. Under stirring, a 1:1 gas mixture of oxygen and nitrogen was passed therethrough at a rate of 5 l./min. to carry out the oxidative polymerization. In this case, the polymerization was continuously cooled so that the reaction temperature did not exceed 35° C. After about 50 minutes a granular polymer began precipitating. After 5.5 hours when the 2,6-dimethylphenol was completely consumed, this polymerization mixture was added in one portion to a vigorously stirred aqueous mixture system maintained at 70° C. comprising 100 kg. water, 4.0 g. polyvinyl alcohol, 1.5 g. sodium dodecylbenzenesulfonate and 0.1 g. tetrasodium ethylenediaminetetraacetate. To the thus obtained homogeneously dispersed system in a homogeneously suspended state were added 2.0 g. t-butyl perbenzoate and 1.0 g. azobisisobutylonitrile. In 4 hours the temperature was elevated to 110° C., and further at 120° C. the polymerization was conducted for 2 hours. A granular solid was filtered, washed with water and dried to obtain 1.9 kg. resin mixture. This resin mixture contains 75% of poly(2,6 - dimethylphenylene - 1,4 - ether). The physical properties thereof are as follows:

Tensile strength: 990 kg./cm.²,
Izod impact strength: 14.1 kg.·cm./cm., and
Thermal deformation temperature: 185° C.

Particles of the resin mixture were stable and were within the range of 50 to 70 micron.

EXAMPLE 4

2,6-dimethylphenol (1.5 kg.), 25 g. of ferric acetate and 25 g. of a cobalt chelate represented by the formula:

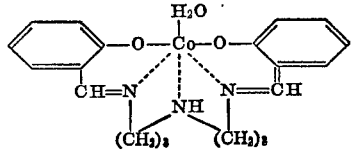

were dissolved in a medium comprising 1.5 kg. of styrene and 2.0 kg. of acetonitrile. Under stirring, oxygen was passed therethrough at a rate of 6 l./min. to carry out the oxidative polymerization. The reaction mixture was continuously cooled under stirring so that the reaction temperature did not exceed 35° C. After about 20 minutes, a granular polymer began precipitating. When the reaction was conducted for 5 hours, monomeric 2,6-dimethylphenol did not remain at all in the reaction mixture. According to Example 1, this polymerization mixture was subjected to the suspension polymerization of styrene so as to obtain 2.9 kg. resin mixture. The composition of this resin mixture is almost 1:1 with respect to the poly(2,6-dimethylphenylene-1,4-ether) and polystyrene. The physical properties thereof are as follows:

Tensile strength: 790 kg./cm.²,
Izod impact strength: 10.7 kg.·cm./cm., and
Thermal deformation temperature: 158° C.

Particles of the resin mixture were stable and were within the range of 120 to 160 micron.

EXAMPLES 5 TO 11

Example 1 was repeated in the same way by changing the aromatic vinyl compound and the 2,6-disubstituted phenol. The yield, tensile strength and Izod impact strength are summarized in the table.

TABLE

| Example No | 5 | 6 | 7 | 8 | 9 | 10 | 11 |
|---|---|---|---|---|---|---|---|
| Aromatic vinyl compound | 4-chlorostyrene. | 2,4-dimethylstyrene. | Vinyltoluene | Styrene | 4-t-butylstyrene. | Dichlorostyrene. | Styrene. |
| 2,6-disubstituted phenol | 2,6-diethylphenol. | 2-chloro-6-phenol. | 2,6-dimethylphenol. | 2-methyl-6-n-butylphenol. | 2,6-dimethylphenol. | 2-ethyl-6-n-phenol. | 2-chloro-6-phenol. |
| Polymer yield (percent) | 98 | 94 | 97 | 97 | 95 | 98 | 97. |
| Tensile strength (kg./cm.²) | 770 | 810 | 720 | 670 | 700 | 830 | 640. |
| Izod impact strength (kg./cm./cm.) | 7.1 | 7.6 | 5.8 | 4.9 | 8.4 | 7.7 | 3.8 |

We claim:

1. A process for producing a resin mixture having a particle size of from 5 to 500 microns of polyphenylene ether and aromatic vinyl compound polymer, which comprises (1) passing oxygen alone or admixed with an inert gas into a solution of a 2,6-disubstituted phenol, an aromatic vinyl compound and a polymerization catalyst for the 2,6-disubstituted phenol in a medium for the 2,6-disubstituted phenol at a temperature of 0 to 100° C., until there is produced a polyphenylene ether which is a polymer of the 2,6-disubstituted phenol, said phenol having the formula

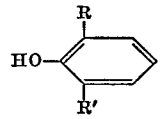

wherein R is a linear alkyl group having 1 to 4 carbon atoms and R' represents a halogen atom, an alkoxy group having 1 to 4 carbon atoms or an alkyl group having 1 to 4 carbon atoms, said medium being a solvent system which dissolves the aromatic vinyl compound and the 2,6-disubstituted phenol but does not dissolve the polyphenylene ether having a $\eta_{sp/c}$ of 0.25 or more, measured in a 0.5% chloroform solution at 250° C., obtained by the polymerization, maintaining the amount of the 2,6-disubstituted phenol at from 15 to 35 weight percent based on the solution, (2) dispersing the thus obtained oxidative polymerization mixture in water containing a suspension stabilizer to transfer the aromatic vinyl compound into the polyphenylene ether, and (3) polymerizing the dispersion at 50 to 180° C. to polymerize the vinyl compound.

2. A process according to claim 1 wherein the medium is selected from the group consisting of methanol, ethanol, n-propanol, isopropanol, n-butanol, isobutanol, n-hexanol, n-heptanol, n-octanol, benzyl alcohol, cyclopentanol, cyclohexanol, water, acetonitrile, propionitrile, acrylonitrile, diethyl ether, tetrahydrofuran, pentane, n-hexane, 2-methylpentane, n-octane, cyclopentane, cyclohexane, dimethylformamide, dimethylacetamide, trimethyleneglycol, hexamethyleneglycol, dimethylsulfoxide, hexamethylphosphotriamide, methyl ethyl ketone, diethyl ketone, acetylacetone, benzyl methyl ketone and diethyl carbonate.

3. A process according to claim 1, wherein 2,6-disubstituted phenol is 2,6-dimethylphenol.

4. A process according to claim 1, wherein the aromatic vinyl compound is styrene, methylstyrene, ethylvinylbenzene, isopropenylbenzene, isopropylstyrene, ethylvinyltoluene, dimethylstyrene, chlorostyrene, dichlorostyrene, trimethylstyrene, or t-butylstyrene.

5. A process according to claim 1, wherein the aromatic vinyl compound is styrene, methylstyrene, chlorostyrene, or dimethylstyrene.

6. A process according to claim 1, wherein 2,6-dimethylphenol is used as the 2,6-disubstituted phenol and styrene is used as the aromatic vinyl compound.

References Cited
UNITED STATES PATENTS 3,306,874  2/1967  Hay _____ 260—47 ET
3,384,682  5/1968  Erchak, Jr. et al. ____ 260—874

MURRAY TILLMAN, Primary Examiner
B. ZIEGLER, Assistant Examiner

U.S. Cl. X.R.

260—29.6 NR, 30.4 R, 30.6 R, 30.8 DS, 31.2 T, 32.4, 32.8 R, 33.4 R, 33.6 UA, 47 ET